United States Patent
Jönsson

(10) Patent No.: US 10,484,622 B2
(45) Date of Patent: Nov. 19, 2019

(54) METHOD FOR IMPROVING IMAGE QUALITY IN IMAGES ACQUIRED BY A NEAR-INFRARED SENSITIVE VIDEO CAMERA AND SUCH A CAMERA

(71) Applicant: Axis AB, Lund (SE)

(72) Inventor: Jimmie Jönsson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/992,856

(22) Filed: May 30, 2018

(65) Prior Publication Data

US 2018/0352175 A1 Dec. 6, 2018

(51) Int. Cl.
| H04N 5/33 | (2006.01) |
| H04N 5/225 | (2006.01) |
| H04N 5/232 | (2006.01) |
| H04N 5/52 | (2006.01) |

(52) U.S. Cl.
CPC ............ *H04N 5/33* (2013.01); *H04N 5/2256* (2013.01); *H04N 5/23296* (2013.01); *H04N 5/52* (2013.01)

(58) Field of Classification Search
CPC ............... H04N 17/002; H04N 5/2256; H04N 5/23296; H04N 5/2354; H04N 5/243; H04N 5/33; H04N 5/52; H04N 5/355; H04N 5/35536; H04N 5/2355; H04N 19/98
USPC ....................... 348/68, 87, 239, 370; 600/109
See application file for complete search history.

(56) References Cited

U.S. PATENT DOCUMENTS

| 9,071,720 | B2 | 6/2015 | Ikari et al. | |
| 9,235,899 | B1 | 1/2016 | Kirmani et al. | |
| 9,929,808 | B2* | 3/2018 | De Bruijn | H04B 10/116 |
| 2002/0018142 | A1* | 2/2002 | Oda | H04N 5/2354 |
| | | | | 348/370 |
| 2006/0177098 | A1* | 8/2006 | Stam | B60Q 1/085 |
| | | | | 382/104 |
| 2013/0329052 | A1 | 12/2013 | Chew | |
| 2015/0009335 | A1 | 1/2015 | Strandemar | |
| 2015/0326791 | A1* | 11/2015 | Stahl | H04N 5/2628 |
| | | | | 348/240.99 |

(Continued)

FOREIGN PATENT DOCUMENTS

| EP | 1 515 545 A1 | 3/2005 |
| WO | 2011024193 A2 | 3/2011 |

(Continued)

OTHER PUBLICATIONS

EP 17173977.4 European Search Report (dated Oct. 11, 2017).

*Primary Examiner* — Nathnael Aynalem
(74) *Attorney, Agent, or Firm* — Volpe and Koenig, P.C.

(57) ABSTRACT

A near-infrared sensitive video camera comprises a control unit configured to: dynamically detect a setting of the camera, the setting being one or more of: a zoom level, a focus setting and a setting of an IR-illuminator of camera. The control unit dynamically acquires a gain setting map for an image sensor, the acquired gain setting map being associated with the dynamically detected setting of the camera and comprising individual gain settings of the image sensor. Dynamically acquiring the gain setting map comprises accessing a database of gain setting maps associated with specific settings of the camera and on the dynamically detected setting of the camera; and dynamically adjusting a gain setting of the image sensor based on the acquired gain setting map.

9 Claims, 3 Drawing Sheets

(56) References Cited

U.S. PATENT DOCUMENTS

2016/0093034 A1\* 3/2016 Beck .................. G06T 5/50
                                                                                                       345/617
2016/0345812 A1 12/2016 Ogasawara

FOREIGN PATENT DOCUMENTS

| WO | 2011024193 | A3 | 3/2011 |
| WO | 2013052383 | A1 | 4/2013 |

\* cited by examiner

METHOD FOR IMPROVING IMAGE QUALITY IN IMAGES ACQUIRED BY A NEAR-INFRARED SENSITIVE VIDEO CAMERA AND SUCH A CAMERA

FIELD OF INVENTION

The present invention relates to method for improving image quality in images acquired by a near-infrared sensitive video camera. It also relates to a near-infrared sensitive video camera for improving image quality in images acquired thereby. Further, the present invention relates to a method for determining gain setting maps for an image sensor of the near-infrared sensitive video camera.

BACKGROUND

Cameras are used in various scenarios, both indoors and outdoors. Some cameras offer both day and night functionality, such as those designed to be used in outdoor installations or in indoor environments with poor lighting. When in day mode, a camera IR-cut filter filters out IR light such that it does not distort the colors of the images as the human eye sees them, but when the camera is in night mode, the IR-cut filter is removed, thereby allowing the light sensitivity of the camera to reach down to 0.001 lux or lower. Near-infrared light, which spans from 700 nm up to about 1000 nm, is beyond what the human eye can see, but most camera sensors can detect it and make use of it.

Thus, when in day mode, i.e., when the light in the scene is above a certain level, the camera delivers color images. As light diminishes below the certain level, the camera switches to night mode to make use of near infrared, IR, light to deliver high-quality black and white images.

In order to enhance the amount of IR light from a scene viewed by the camera set in night mode, the camera may be equipped with an IR-illuminator configured to illuminate the scene with IR-light. However, depending on the quality of the IR-illuminator and/or the mechanical platform of the camera, an even illumination of the scene might not be possible. A non-even illumination of the scene will affect the quality of the images captured by the camera in night mode. Other factors that might affect the image quality include changes in vignetting of the zoom lens changing due to different levels of zoom. Hence, there is a need for improvement in image quality of images captured with the camera in night mode, in particular when an IR-illuminator is utilized.

One solution to this problem is to specially design the IR-illuminator so that the illumination provided by it is more even. However, such an approach requires vast simulations and testing of the IR-illuminator.

SUMMARY

Mitigating, alleviating or eliminating one or more of the above-identified deficiencies in the art and disadvantages singly or in any combination and solving at least the above mentioned problem would be desirable.

According to a first aspect, a method for improving image quality in images acquired by a near-infrared sensitive video camera viewing a scene is provided. The method comprises: dynamically detecting a setting of the near-infrared sensitive video camera, the setting being one or more of: a zoom level of the near-infrared sensitive video camera, a focus setting of the near-infrared sensitive video camera, and a setting of an infrared-illuminator, IR-illuminator, of the near-infrared sensitive video camera, the IR-illuminator illuminating the scene; dynamically acquiring a gain setting map for the near-infrared sensitive video camera, the acquired gain setting map being associated with the dynamically detected setting of the near-infrared sensitive video camera and comprising individual gain settings for pixels or group of pixels of the near-infrared sensitive video camera, wherein the dynamically acquiring of the gain setting map is based on accessing a database comprising gain setting maps associated with specific settings of the near-infrared sensitive video camera and on the dynamically detected setting of the near-infrared sensitive video camera; and dynamically adjusting a gain setting of the near-infrared sensitive video camera based on the acquired gain setting map.

By this method non-even IR illumination of a scene may be compensated for and images experienced to have a more uniform light distribution may be acquired, especially upon using the near-infrared sensitive video camera in night mode. Further, the present method is dynamic and depends upon setting of the near-infrared sensitive video camera. Non-evenness of IR illumination of a scene may, for example, depend on the zoom level of the near-infrared sensitive video camera. For example, in max wide zoom level the non-evenness of IR illumination is normally very much different than in max tele zoom level. Hence, by dynamically considering one or more settings of the near-infrared sensitive video camera, different natures in the non-evenness may be compensated for in an efficient manner.

Further, the present method will mitigate the need for costly design considerations for IR-illuminators. The present method will further mitigate the need for extensive testing of the IR-illuminators when developing new cameras. For example, accomplishment of a correct placement of the IR-light sources of the IR-illuminator and the quality of the IR-light sources may be less critical.

The act of dynamically detecting a setting of the near-infrared sensitive video camera, may comprise detecting a setting of the IR-illuminator of the near-infrared sensitive video camera.

The act of dynamically detecting a setting of the near-infrared sensitive video camera, may comprise detecting a setting of the IR-illuminator of the near-infrared sensitive video camera and one or both of the zoom level of the near-infrared sensitive video camera and the focus setting of the near-infrared sensitive video camera.

The setting of the IR-illuminator may comprise one or more of: a luminosity of the IR-illuminator, a zoom level of the IR-illuminator, and a shape of a light distribution of the IR-illuminator. The luminosity of the IR-illuminator is referring to the total amount of energy emitted by a IR-illuminator. This is a consequence of an effect delivered to one or more light sources of the IR-illuminator. The zoom level of the IR-illuminator refers to the spread of the light emitted from the IR-illuminator. In each specific zoom level, light emitted from the IR-illuminator is controlled so that it has a specific spread. The shape of the light distribution of the IR-illuminator refers to a shape of a light beam emitted by the IR-illuminator. The shape of the light beam emitted by the IR-illuminator may be controlled in many different ways, e.g. some part of the light may be blocked, a lens may be used for shaping the light, and/or a plurality of individual light sources may be individually controlled for influencing the shape of the light beam emitted by the IR-illuminator.

The IR-illuminator may comprise a plurality of IR-light sources, wherein the setting of the IR-illuminator illuminating the scene may comprise one or more of: a configuration of the IR-illuminator, a luminosity of each of the plurality of IR-light sources, a zoom level of each of the plurality of IR-light sources, and a shape of a light distribution of each of the plurality of IR-light sources. The configuration of the IR-illuminator refers to which of the plurality of IR-light source(s) that is/are used in order to achieve the present setting of the IR-illuminator.

Dynamically acquiring the gain setting map may comprise acquiring, based on the dynamically detected setting of the near-infrared sensitive video camera, data to the gain setting map from one or more of the gain setting maps of the database. Hence, static gain setting maps or gain setting maps taking values from different ones of the gain setting maps of the database may be used.

Dynamically acquiring the gain setting map may comprise computing, based on the dynamically detected setting of the near-infrared sensitive video camera, data to the gain setting map from one or more of the gain setting maps of the database. This will allow for computing new gain setting maps on the fly using already existing static gain setting maps.

According to a second aspect, a non-transitory computer-readable recording medium is provided. The non-transitory computer-readable recording medium has recorded thereon a program for implementing the method according to the first aspect when executed on a device having processing capabilities.

The device may be the near-infrared sensitive video camera comprising an image sensor and at least one of a zoom lens, a focusing unit and an IR-illuminator.

According to a third aspect, a near-infrared sensitive video camera is provided. The near-infrared sensitive video camera comprises a control unit configured to: dynamically detect a setting of the near-infrared sensitive video camera, the setting being one or more of: a zoom level of a zoom lens of the near-infrared sensitive video camera, a focus setting of a focusing unit of the near-infrared sensitive video camera, and a setting of an IR-illuminator of the near-infrared sensitive video camera; dynamically acquire a gain setting map for the near-infrared sensitive video camera, the acquired gain setting map being associated with the dynamically detected setting of the near-infrared sensitive video camera and comprising individual gain settings for pixels or group of pixels of the near-infrared sensitive video camera, wherein the dynamically acquiring of the gain setting map is based on accessing a database comprising gain setting maps associated with specific settings of the near-infrared sensitive video camera and on the dynamically detected setting of the near-infrared sensitive video camera; and dynamically adjust a gain setting of pixels or group of pixels of the near-infrared sensitive video camera based on the acquired gain setting map.

The near-infrared sensitive video camera may further comprise a memory configured to store the database comprising gain setting maps associated with specific settings of the near-infrared sensitive video camera.

The setting of the IR-illuminator may comprise one or more of: a luminosity of the IR-illuminator, a zoom level of the IR-illuminator, and a shape of a light distribution of the IR-illuminator.

The IR-illuminator may comprise a plurality of IR-light sources, wherein the setting of the IR-illuminator comprises one or more of: a configuration of the IR-illuminator, a luminosity of each of the plurality of IR-light sources, a zoom level of each of the plurality of IR-light sources, and a shape of a light distribution of each of the plurality of IR-light sources.

The above mentioned features of the method of the first aspect, when applicable, apply to this third aspect as well. In order to avoid undue repetition, reference is made to the above.

According to a fourth aspect, a method for determining gain setting maps for a near-infrared sensitive video camera is provided. The method for determining gain setting maps for a near-infrared sensitive video camera comprises setting the near-infrared sensitive video camera in a first setting, the first setting being specific in respect of one or more of: a zoom level of the near-infrared sensitive video camera, a focus setting of the near-infrared sensitive video camera, and a setting of an IR-illuminator of the near-infrared sensitive video camera, the IR-illuminator illuminating the calibration scene; acquiring one or more first images of a calibration scene viewed by the near-infrared sensitive video camera, wherein the near-infrared sensitive video camera is set in the first setting; determining a first gain setting map based on an analysis of the one or more acquired first images; and associating the first gain setting map with the first setting of the near-infrared sensitive video camera.

By this method for determining gain setting maps for a near-infrared sensitive video camera, a simple and straightforward method for determining gain setting maps for a near-infrared sensitive video camera is provided. The method may be used for every single near-infrared sensitive video camera. Alternatively, the method may be performed on one or a few of a large number of near-infrared sensitive video cameras of the same type or model. This in order to create a common set of gain setting maps for the type or model of near-infrared sensitive video camera.

The method for determining gain setting maps for a near-infrared sensitive video camera may further comprise storing the first gain setting map in a database of gain setting maps as a gain setting map associated with the first setting of the near-infrared sensitive video camera.

The method for determining gain setting maps for a near-infrared sensitive video camera may further comprise: setting the near-infrared sensitive video camera in a second setting, the second setting being different from the first setting in respect of one or more of: the zoom level of the near-infrared sensitive video camera, the focus setting of the near-infrared sensitive video camera, and the setting of the IR-illuminator of the near-infrared sensitive video camera; acquiring one or more second images of the calibration scene, wherein the near-infrared sensitive video camera is set in the second setting; determining a second gain setting map based on an analysis of the one or more acquired second images; and associating the second gain setting map with the second setting of the near-infrared sensitive video camera.

The method for determining gain setting maps for a near-infrared sensitive video camera may further comprise storing the second gain setting map in the database of gain setting maps as a gain setting map associated with the second setting of the near-infrared sensitive video camera.

A further scope of applicability of the present teachings will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that the teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended drawings showing embodiments of the invention. The figures should not be considered limiting the invention to the specific embodiment; instead they are used for explaining and understanding the teachings.

As illustrated in the figures, the sizes of layers and regions are exaggerated for illustrative purposes and, thus, are provided to illustrate the general structures of embodiments of the present teachings. Like reference numerals refer to like elements throughout.

DETAILED DESCRIPTION OF THE PREFERRED EMBODIMENTS

The present invention will now be described more fully hereinafter with reference to the accompanying drawings, in which currently preferred embodiments are shown. However, the teachings may be embodied in many different forms and should not be construed as limited to the embodiments set forth herein; rather, these embodiments are provided for thoroughness and completeness, and to fully convey the scope to the skilled person.

Figure 1:
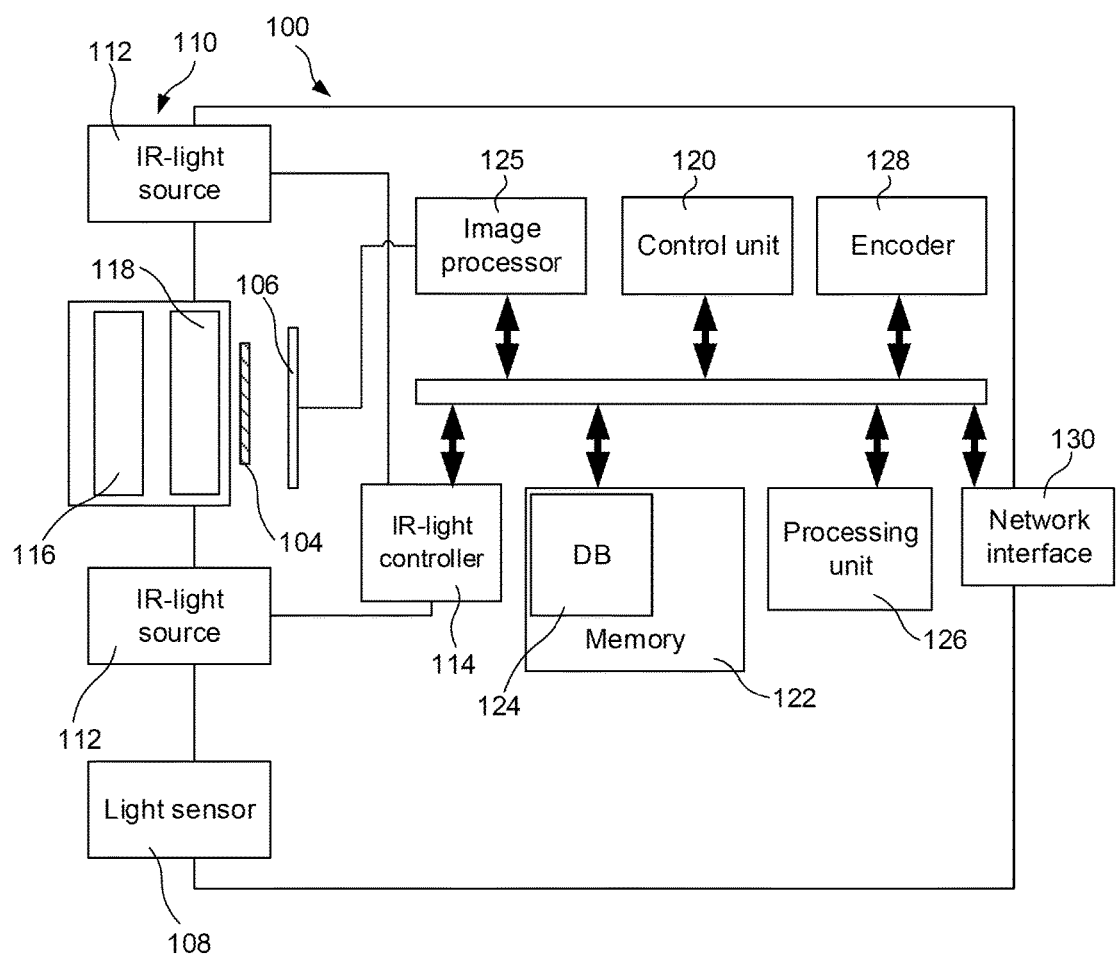
FIG. 1 schematically illustrates a near-infrared sensitive video camera.

FIG. 1 schematically illustrates a near-infrared sensitive video camera 100, below referred to as the camera 100. The camera 100 is primarily developed for monitoring applications; however, the camera 100 may as well be used for other applications. The camera 100 may be a network video camera. The camera 100 may be an IP-camera. The camera 100 may be a monitoring camera. The camera 100 may be a digital camera. The camera 100 is configured to view a scene and to capture images of the scene. Especially, the camera 100 is configured to be used during low light conditions, e.g. during night. Low light condition may be determined to be a light condition wherein an amount of light in the scene is at or below a threshold value. However, the near-infrared sensitive video camera 100 may as well be used when the amount of light in the scene is above the threshold value. Hence, the near-infrared sensitive video camera 100 may have day and night functionality, i.e. it is operable in a day mode (the amount of light in the scene is above the threshold value) and in a night mode (the amount of light in the scene is at or below the threshold value). Video cameras offering both day and night functionality are said to be designed to be used in outdoor installations or in indoor environments with poor lighting.

Upon the camera 100 operating in day mode, a near-infrared cut filter 104, below referred to as the filter 104, may be used to block near-infrared light from reaching an image sensor 106 of the camera 100. The filter 104 may also block a broader spectrum of infrared light from reaching the image sensor 106 of the camera 100. Hence, the filter 104 is an optical filter which filters out near-infrared light, and optionally also a broader spectrum of infrared light. The filter 104 may be moved between a first position where it blocks near-infrared light from reaching the image sensor 106 and a second position where it allows near-infrared light to reach the image sensor 106. Instead of a filter being physically moved between a blocking position and a non-blocking position, the filter 104 may be implemented as a tuneable optical filter which can be electronically controlled to allow selected wavelengths to pass or not to pass. Hence, images captured by the camera 100 during day mode may not visualize any near-infrared input. By blocking near-infrared light from reaching the image sensor 106 the near-infrared light does not distort the colours of images captured by the camera 100. In day mode, the camera 100 may be configured to capture colour images.

In night mode, the filter 104 will be set to allow near-infrared light to reach the image sensor 106, thereby enabling the camera 100 to capture images including near-infrared input. Hence, in night mode the camera 100 is much more light sensitive. By allow near-infrared light to reach the image sensor 106 the light sensitivity of the camera 100 may reach down to 0.001 lux or lower. Near-infrared light, which spans from 700 nm up to about 1000 nm, is beyond what the human eye can see, but most image sensors can detect it and make use of it. Upon in night mode the camera 100 may make use of the captured near-infrared light to deliver high-quality black and white images.

The camera 100 may be able to switch automatically between day mode and night mode, based on the amount of light in the scene. For this, the camera 100 may comprise a light sensor 108 configured to measure the amount of light of the scene viewed by the camera 100. The light sensor 108 may either be part of the camera 100, such as is schematically illustrated in FIG. 1, or be external to the camera 100, e.g., placed in a relevant part of the scene view by the camera 100. Alternatively, the amount of light of the scene viewed by the camera 100 may be determined based on the brightness of images captured by the camera 100. The brightness of images captured by the camera 100 may e.g. be determined by an image processing unit 110 of the camera 100. Other means of switching between day mode and night mode may also be provided, such as switching mode based on a pre-defined schedule, user input or other events.

During low light conditions an IR-illuminator 110 of the camera 100 is configured to illuminate the scene viewed by the camera 100. The IR-illuminator 110 is configured to illuminate the scene viewed by the camera 100 with near-infrared light. Optionally, the IR-illuminator 110 is configured to illuminate the scene viewed by the camera 100 with infrared light of a broader spectrum. The IR-illuminator 110 may comprise one or more IR-light sources 112. The one or more IR-light sources 112 may e.g. be LEDs configured to emit IR-light, hence, the IR-illuminator 110 may be an LED based IR-illuminator. The IR-illuminator 110 may further comprise an IR-light controller 114. The IR-light controller 114 is configured to control one or more of a luminosity of the IR-illuminator 110, a zoom level of the IR-illuminator 110, a configuration of IR-illuminator 110, and a shape of a light distribution of the IR-illuminator 110. Hence, by controlling one or more of the luminosity, the zoom level, the configuration, and the shape of a light distribution of the IR-illuminator 110, the IR-illuminator 110 may be set in different settings. Hence, the IR-light controller 114 is configured to control the one or more IR-light sources 112. The IR-light controller 114 is configured to control one or more of a luminosity of each of the one or more IR-light sources 112, a zoom level of each of the one or more of IR-light sources 112 and a shape of a light distribution of each of the one or more of IR-light sources 112.

The luminosity of the IR-illuminator 110 may be controlled by adjusting the luminosity of the one or more IR-light sources 112 individually or together. The luminosity of an individual IR-light source 112 is controlled by adjusting an effect delivered to the individual IR-light source 112. One reason for adjusting the effect delivered to an individual IR-light source 112 may be that that specific individual IR-light source 112 is overheating. Another, reason for adjusting the effect delivered to an individual IR-light source 112 may be that an effect budget of the camera 100 needs to be changed so that less effect will be available for the IR-illuminator 110. This may e.g. be the case if the camera need to be heated by a heater (not shown), in such case the effect available for the IR-illuminator may be needed to be reduced due to effect constraints of the power supply of the camera 100

The IR-illuminator 110 may be configured to have different zoom levels. In each specific zoom level, the light emitted from the IR-illuminator is controlled so that it has a specific spread. For example, the IR-illuminator 110 may have one zoom level being a wide zoom level for illuminating objects relatively close to the camera 100, and one zoom level being a narrow zoom level for illuminating objects being relatively far away from the camera 100. Of course the IR-illuminator 110 may have more than two different zoom levels. Setting the IR-illuminator 110 in different zoom levels may be achieved by controlling a lens in front of the one or more IR-light sources 112. Alternatively, setting the IR-illuminator 110 in different zoom levels may be achieved by controlling different dedicated IR-light sources 112 of the IR-illuminator 110. Hence, the IR-illuminator 110 may comprise one or more IR-light sources 112 dedicated to illuminate objects relatively close to the camera 100, i.e. one or more wide zoom level IR-light sources 112, and other one or more IR-light sources 112 dedicated to illuminate objects relatively far away from the camera 100, i.e. one or more narrow zoom level IR-light sources 112.

The configuration of the IR-illuminator 110 refers to which of a plurality of IR-light sources 112 that is/are used in order to achieve the present setting of the IR-illuminator 110. As mentioned above, the IR-illuminator 110 may comprise one or more wide zoom level IR-light sources 112, and one or more narrow zoom level IR-light sources 112, and hence the configuration of the IR-illuminator 110 may be which one or more of the plurality of IR-light sources 112 that is/are used The shape of the light distribution of the IR-illuminator 110 refers to a shape of a light beam emitted by the IR-illuminator 110. The shape of the light distribution of the IR-illuminator 110 may be controlled by individually controlling a plurality of IR-light sources 112. The shape of the light distribution of the IR-illuminator 110 may also be controlled by partially blocking light emitted by one or more of the IR-light sources 112. The blocking may be passively made by structural parts of the camera 100 itself, e.g. the housing or parts of the housing may block a portion of light emitted by one or more of the one or more IR-light sources 112. Further, the blocking may be active. In active blocking the camera comprises active elements (not shown) that are deliberately inserted in the light beam emitted from one or more of the one or more IR-light sources 112 for actively shaping the shape of the light distribution of the IR-illuminator 110.

In case the IR-illuminator 110 comprises a plurality of IR-light sources 112, then a specific setting of the IR-illuminator 110 may comprise one or more of: a configuration of the IR-illuminator 100, a luminosity of each of the plurality of IR-light sources, a zoom level of each of the plurality of IR-light sources, and a shape of a light distribution of each of the plurality of IR-light sources.

The camera 100 further comprises a zoom lens 116 and a focusing unit 118.

The zoom lens is an assembly of lens elements for which the angle of view for the camera 100 may be varied. Hence, by controlling the zoom lens 116 different zoom levels of the camera may be set.

The focusing unit 118 is configured to focus the camera 100, usually by moving one or more focus lenses to set a focus distance which allows the camera to capture sharp images of the scene views by the camera 100, or at least selected parts thereof. Hence, the focusing unit 118 is configured to be set in a focus setting. The setting of a proper focus distance may be made in a different manner. For example, a contrast-based focusing method may be used. Such methods are well known to the person skilled in the art and will not be discussed in more detail herein. Alternative, or in combination, the camera 100 may comprise a range meter (not shown) which measures a reference distance to an object in the scene. Use of range meters for setting a focus distance is well known to the person skilled in the art and will not be discussed in more detail herein.

Accordingly, one or more of the zoom level of the zoom lens 116, the focus setting of a focusing unit 118 and the setting of the IR-illuminator 110 may be varied over time. Hence, one or more of the zoom level, the focus setting and the setting of the IR-illuminator 110 may be dynamically changed.

The camera further comprises a control unit 120. The control unit 120 is configured to detect a setting of the camera 100, the setting being one or more of the zoom level of the zoom lens 116, the focus setting of the focusing unit 118, and the setting of then IR-illuminator 110. The control unit 120 is configured to dynamically detect the setting of the camera 100. Hence, for different points in time the control unit 120 is configured to detect a current setting of the camera 100. Accordingly, the control unit 120 is configured to detect the setting of the camera 100 with a temporal resolution.

Further, the control unit 120 is configured to dynamically acquire a gain setting map for the camera 100. Hence, for different points in time the control unit 120 is configured to acquire the gain setting map for the camera 100. Accordingly, the control unit 120 is configured to acquire the gain setting map for the camera 100 with a temporal resolution. The acquired gain setting map comprises individual gain settings for pixels or group of pixels of images to be captured by the camera 100. For example, the individual gain settings of the gain setting map may be individual digital gain settings for pixels or group of pixels of images to be captured by the camera 100. Alternatively, or in combination, the individual gain settings of the gain setting map may be individual gain setting of the image sensor 106. Dynamically acquiring the gain setting map is based on accessing a database 124 comprising gain setting maps associated with specific settings of the camera 100. Dynamically acquiring the gain setting map is further based on the dynamically detected setting of the camera 100. Hence, the acquired gain setting map is associated with the dynamically detected setting of the camera 100. The control unit 120 may hence be configured to acquire the gain setting map that is associated with settings being a closest match with the current settings of the camera determined by the control unit 120. The database 124 may as in the FIG. 1 disclosed embodiment be stored in a memory 122 of the camera 100. Alternatively, or in combination, the camera 100 may be configured to access the database 124 being stored elsewhere in a computer network (not shown) to which the camera 100 is connected. Hence, the camera 100 may be a network enabled camera 100 having a network interface 130 configured to connect the camera to the computer network. The computer network relates to a network which allow devices, e.g. the camera 100, connected thereto to exchange digital data. Connections between devices connected to the computer network are established using either cables or wirelessly. Non limiting examples of digital networks are the Internet, an intranet, a local area network and a cellular network. Alternatively, or in combination, the camera 100 may be configured to access the database 124 being distributed on a plurality of devices within the computer network. As mentioned above, the database 124 comprises gain setting maps associated with specific settings of the camera 100 such gain setting maps associated with specific settings of the camera 100 is preferably acquired during calibration of the camera 100 or a camera of the same model or type of camera as the camera 100. Examples of methods for performing such a calibration, e.g. methods for determining gain setting maps for different settings of the camera 100, will be discussed further down in this disclosure. As also mentioned above, the database 124 may be stored on a memory 122 of the camera 100. The memory 122 is preferably a non-volatile memory.

Furthermore, the control unit 120 is configured to dynamically adjust a gain setting affecting pixels or group of pixels of images to be captured by the camera 100 based on the acquired gain setting map. Hence, for different points in time, the control unit 120 is configured to adjust the gain setting of pixels or group of pixels for images to be captured by the camera 100. Accordingly, the control unit 120 is configured to adjust the gain setting of pixels or group of pixels of the camera 100 with a temporal resolution.

The control unit 120 may be configured to adjust the gain setting of pixels or group of pixels of the camera 100 directly based on the acquired gain setting map. Hence, the values of the gain setting map acquired from the database 124 are directly used for setting the gain of the camera 100. Alternatively, the control unit 120 may be configured to derive a new gain setting map from two or more gain setting maps stored in the database 124. Hence, the control unit 120 may be configured to derive the gain setting map on the fly using already existing gain setting maps stored in the database 124. Such derivation may e.g. be made using interpolation.

The control unit 120 may further be configured to be set in an active and in an inactive state. The active state of the control unit 120 corresponds to when the camera is in the night mode and the inactive state corresponds to when the camera is in the day mode. This might prevent image quality degradation upon the camera being in day mode when the light conditions are good.

The camera 100 may further comprise one or more of an image processor 125, a processing unit 126, and an encoder 128. Any one of the IR-light controller 114, the control unit 120, the image processor 125 and/or the encoding unit 128 may be implemented as a dedicated hardware circuit and/or software module. In case of being software implemented the software may be run on the processing unit 126. The processing 126 may be any suitable processing unit for performing digital data processing. The processing unit 126 may be a central processing unit, CPU. The processing unit 126 may be a microcontroller unit MPU. The processing unit 126 may be a graphics processing unit GPU. It shall also be noted that any dedicated hardware circuit may in part comprise software portions being run on a dedicated processor or on the processing unit 126.

Further, the memory 122 of the camera 100 may comprise other forms of digital data than the database 124. This other form of digital data may be permanently or temporally stored on the memory 122. The memory 122 may be a single unit. Alternatively, the memory 122 may be divided into a plurality of memory units. At least one of the plurality of memory units may be used as a buffer memory for buffering data while processing. At least one of the plurality of memory units may be a volatile memory.

Figure 2:
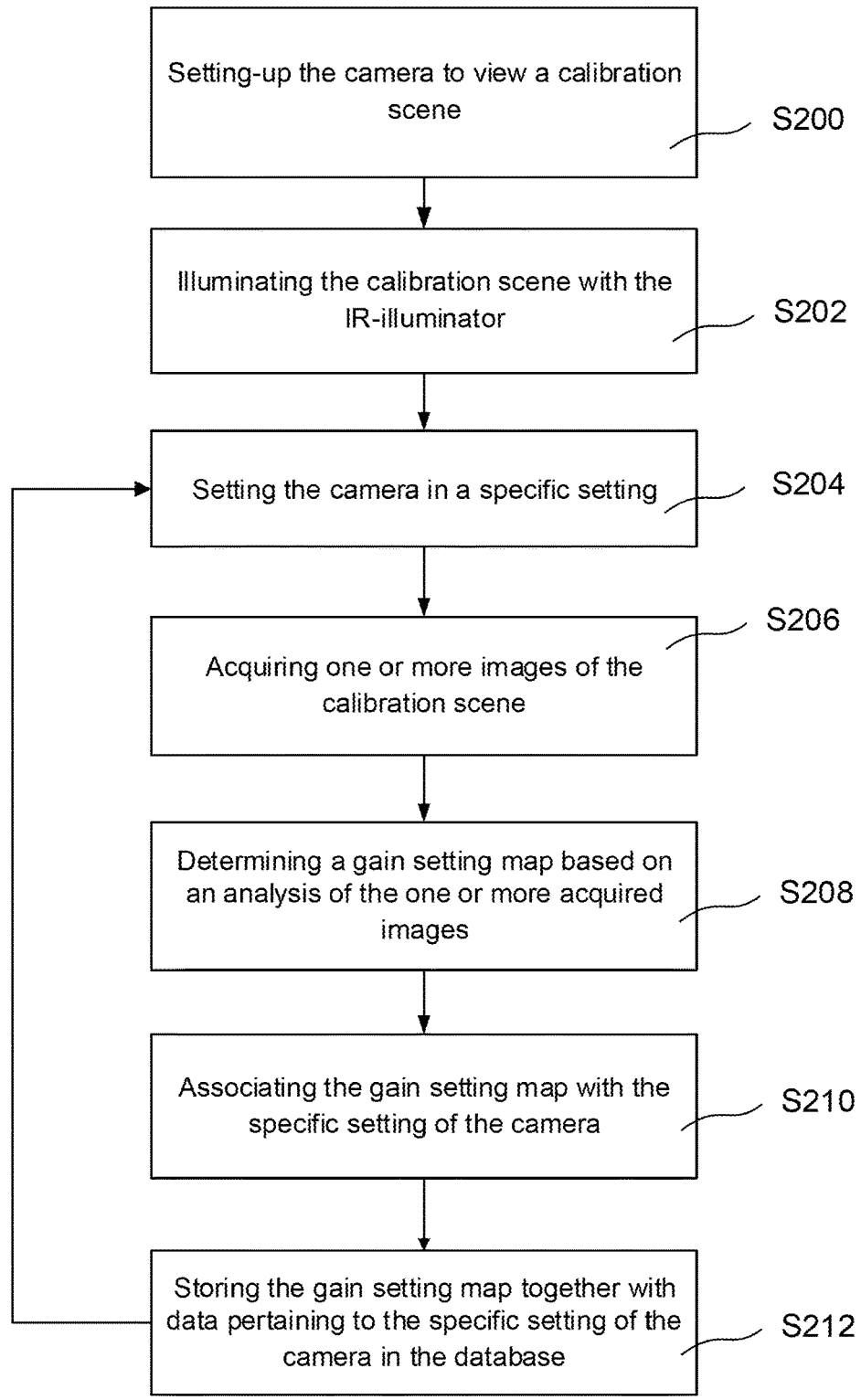
FIG. 2 is a block scheme of a method for determination of gain setting maps for the near-infrared sensitive video camera.

With reference to FIG. 2, calibration of a camera 100 will be discussed, i.e. determination of gain setting maps for the camera 100 for different settings of the camera 100 will be discussed. It shall be noted that every near-infrared sensitive video camera may be individually calibrated such that a set of gain setting maps of every specific near-infrared sensitive video camera may be determined and stored in a database. Such a database may be locally stored in every specific near-infrared sensitive video camera. However, for some embodiments a common set of gain setting maps for a type or model of near-infrared sensitive video camera may be determined. The calibration may then be performed on one or a few of near-infrared sensitive video cameras of the model or type and be used for all near-infrared sensitive video cameras of the model or type. As discussed above, the common set of gain setting maps may be stored locally on each near-infrared sensitive video camera of the model or type. Alternatively, the near-infrared sensitive video camera may be configured to access an external database comprising the common set of gain setting maps.

The determination of gain setting maps comprises one or more of the following acts. Setting-up S200 a near-infrared sensitive video camera 100 to view a calibration scene. The calibration scene may e.g. be a white screen arranged in a dark room. Setting S202 the near-infrared sensitive video camera 100 in night mode, hence the IR-illuminator 110 is illuminating the calibration scene. Setting S204 the near-infrared sensitive video camera 100 in a specific setting, the specific setting being specific in respect of one or more of: a zoom level of the camera 100, a focus setting of the camera 100, and a setting of the IR-illuminator 110 of the camera 100. Acquiring S206 one or more images of the calibration scene. The one or more images are acquired upon the camera 100 is set in the specific setting. Determining S208 a gain setting map based on an analysis of the one or more acquired images. The act of determining S208 the gain setting map may comprise determining the gain setting map such that an image captured with the camera 100 being set in the specific setting has an even light distribution. This may e.g. be made by calculating a correction factor for each pixel of the image sensor 106. For this purpose, the method may further comprise an act of making an off-set calibration, corresponding to a dark current, for the individual pixels of the image sensor 106 of the camera 100. The off-set calibration may e.g. be made by keeping an iris of the camera 100 closed and measure the signal from the individual pixels of the image sensor 106.

Associating S210 the gain setting map with the specific setting of the camera 100. Storing S212 the gain setting map together with data pertaining to the specific setting of the camera 100 in the database 124. The acts S204 through S212 may thereafter be repeated for different specific settings of the camera 100.

Alternatively, or in combination, a gain setting map for a specific setting of the camera 100 may be estimated from calibration data pertaining to another specific setting of the camera 100. For example, the IR-illuminator 110 of the camera 100 may be set in a wide zoom level. Usually, the effect of uneven illumination of the scene viewed by the camera 100 is the worst for such a specific setting of the camera 100. From calibration data obtained while the IR-illuminator 110 of the camera 100 is set in the wide zoom level, a gain setting map for another setting of the IR-illuminator 110 of the camera 100 (being a setting wherein the IR-illuminator 110 is set in a narrower zoom level than the wide zoom level) may be determined. This may e.g. be made by using a pre-known model of the optics for the camera 100.

Figure 3:
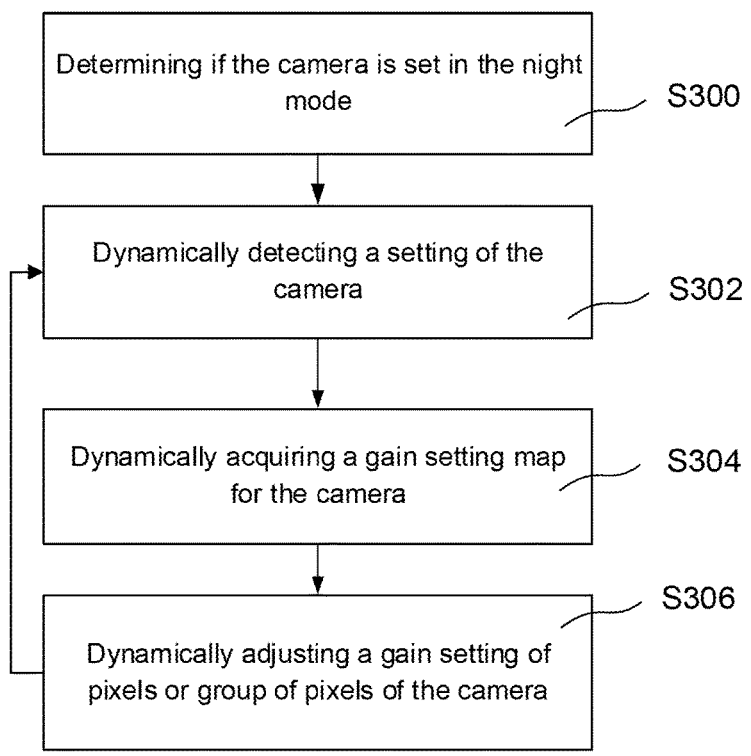
FIG. 3 is a block scheme of a method for improving image quality in images acquired by the near-infrared sensitive video camera.

With reference to FIG. 3 a method for improving image quality in images acquired by the near-infrared sensitive video camera 100 viewing a scene will be discussed. The method comprises one or more of the following acts. Determining S300 if the camera 100 is set in the night mode. Dynamically detecting S302 a setting of the camera 100, the setting being one or more of: a zoom level of the camera 100, a focus setting of the camera 100, and a setting of the IR-illuminator 110 of camera 100. The setting of the IR-illuminator 110 may comprise one or more of: the luminosity of the IR-illuminator, the zoom level of the IR-illuminator, the configuration of IR-illuminator, and the shape of the light distribution of the IR-illuminator. The luminosity, the zoom level, the configuration, and the shape of the light distribution of the IR-illuminator are discussed in more detail above. Dynamically acquiring S304 a gain setting map for the camera 100. The acquired gain setting map being associated with the dynamically detected setting of the camera 100. The acquired gain setting map comprises individual gain settings for pixels or group of pixels of the camera 100. Dynamically acquiring the gain setting map is based on accessing the database comprising gain setting maps associated with specific settings of the camera 100. Dynamically acquiring the gain setting map is further based on the dynamically detected setting of the near-infrared sensitive video camera 100. Dynamically adjusting S306 a gain setting of pixels or group of pixels of the camera 100 based on the acquired gain setting map. Dynamically adjusting the gain setting of pixels or group of pixels of the camera 100 may e.g. be performed by adjusting a digital gain of the camera 100 or by adjusting the gain of pixels or group of pixels of the image sensor 106. By dynamically adjusting the gain setting of pixels or group of pixels of the camera 100 overall image quality of images captured by the camera 100 will be improved.

The person skilled in the art realizes that the present teachings by no means are limited to the embodiments described above. On the contrary, many modifications and variations are possible within the scope of the appended claims.

For example, dynamically acquiring the gain setting map may comprise, acquiring, based on the dynamically detected setting of the near-infrared sensitive video camera 100, data to the gain setting map from one or more of the gain setting maps of the database. Alternatively, or in combination, dynamically acquiring the gain setting map may comprise computing, based on the dynamically detected setting of the near-infrared sensitive video camera 100, data to the gain setting map from one or more of the gain setting maps of the database.

Additionally, variations to the disclosed embodiments can be understood and effected by the skilled person in practicing the claimed invention, from a study of the drawings, the disclosure, and the appended claims.

What is claimed is:

1. A method for improving image quality in images acquired by a near-infrared sensitive video camera viewing a scene, the method comprising:
   dynamically detecting a setting of an infrared (IR) -illuminator of the near-infrared sensitive video camera, the IR-illuminator illuminating the scene, wherein the setting of the IR-illuminator comprises one or more of:
   a zoom level of the IR-illuminator, and
   a shape of a light distribution of the IR-illuminator;
       dynamically acquiring a gain setting map for the near-infrared sensitive video camera, the acquired gain setting map being associated with the dynamically detected setting of the IR-illuminator and comprising individual gain settings for pixels or group of pixels of the near-infrared sensitive video camera, wherein dynamically acquiring the gain setting map is based on accessing a database comprising gain setting maps associated with specific settings of the IR-illuminator and on the dynamically detected setting of the IR-illuminator; and
       dynamically adjusting a gain setting of the near-infrared sensitive video camera based on the acquired gain setting map.

2. The method according to claim 1, wherein IR-illuminator comprises a plurality of IR-light sources, wherein the setting of the IR-illuminator illuminating the scene comprises one or more of:
   a configuration of IR-illuminator,
   a luminosity of each of the plurality of IR-light sources,
   a zoom level of each of the plurality of IR-light sources, and
   a shape of a light distribution of each of the plurality of IR-light sources.

3. The method according to claim 1, wherein the dynamically acquiring of the gain setting map comprises acquiring, based on the dynamically detected setting of the IR-illuminator, data to the gain setting map from one or more of the gain setting maps of the database.

4. The method according to claim 1, wherein dynamically acquiring the gain setting map comprises computing, based on the dynamically detected setting of the IR-illuminator, data to the gain setting map from one or more of the gain setting maps of the database.

5. A non-transitory computer-readable recording medium having recorded thereon a program for implementing the method according to claim 1 when executed on a device having processing capabilities.

6. The non-transitory computer-readable recording medium according to claim 5, wherein the device is the near-infrared sensitive video camera comprising an image sensor and at least one of a zoom lens, a focusing unit and an IR-illuminator.

7. A near-infrared sensitive video camera comprising:
an IR-illuminator; and
a processor, wherein the processor is configured to:
  dynamically detect a setting of the IR-illuminator, wherein the setting of the IR-illuminator comprises one or more of: a zoom level of the IR-illuminator, and a shape of a light distribution of the IR-illuminator;
  dynamically acquire a gain setting map for the near-infrared sensitive video camera, the acquired gain setting map being associated with the dynamically detected setting of the IR-illuminator and comprising individual gain settings for pixels or group of pixels of the near-infrared sensitive video camera, wherein dynamically acquiring the gain setting map is based on accessing a database comprising gain setting maps associated with specific settings of the IR-illuminator and on the dynamically detected setting of the IR-illuminator; and
  dynamically adjust a gain setting of pixels or group of pixels of the near-infrared sensitive video camera based on the acquired gain setting map.

8. The near-infrared sensitive video camera according to claim 7, further comprising a memory configured to store the database comprising gain setting maps associated with specific settings of the IR-illuminator.

9. The near-infrared sensitive video camera according to claim 7, wherein the IR-illuminator comprises a plurality of IR-light sources, wherein the setting of the IR-illuminator comprises one or more of:
  a configuration of IR-illuminator,
  a luminosity of each of the plurality of IR-light sources,
  a zoom level of each of the plurality of IR-light sources, and
  a shape of a light distribution of each of the plurality of IR-light sources.

* * * * *